United States Patent [19]
Jefferson

[11] 3,813,059
[45] May 28, 1974

[54] AEROFOIL ASSEMBLY

[76] Inventor: Raymond Jefferson, 84 Park Rd., Rosyth, Fife, England

[22] Filed: Aug. 31, 1972

[21] Appl. No.: 285,373

[30] Foreign Application Priority Data
Sept. 15, 1971 Great Britain.................... 42951/71

[52] U.S. Cl. ............................ 244/12 C, 244/23 C
[51] Int. Cl. ............................................. B64c 29/02
[58] Field of Search .... 244/12 C, 12 R, 23 C, 23 R, 244/69

[56] References Cited
UNITED STATES PATENTS

| | | | |
|---|---|---|---|
| 3,096,044 | 7/1963 | Gould | 244/12 C |
| 3,104,853 | 9/1963 | Klein | 244/12 C |
| 3,465,989 | 9/1969 | Bowshier | 244/23 C |

FOREIGN PATENTS OR APPLICATIONS

| | | | |
|---|---|---|---|
| 678,700 | 1/1964 | Canada | 244/23 C |
| 750,805 | 1/1967 | Canada | 244/12 C |

Primary Examiner—Milton Buchler
Assistant Examiner—Barry L. Kelmachter
Attorney, Agent, or Firm—John E. Becker

[57] ABSTRACT

An aerofoil assembly for rotary-wing aircraft, which includes a generally planar annular frame which supports radially inner and outer sets of aerofoil blades. The two sets of blades each lie in the plane of the frame and are each disposed to form an annulus and are supported by the frame for rotation about a common axis. In a preferred embodiment, the inner set of blades has a substantially larger surface area than the outer set and the means diameters of the two sets are such that the two sets of blades produce a balanced lifting force in operation for equal rotation velocities of the two seats.

8 Claims, 9 Drawing Figures

AEROFOIL ASSEMBLY

This invention relates to an aerofoil assembly and to an aircraft incorporating such an assembly.

Aerofoil assemblies are at present known in fixed-wing aircraft and in rotary-wing aircraft and in both types the operation is governed by the fact that, to a first approximation, the lifting force achieved by an aerofoil is directly proportional to the product of its surface area and to the square of the speed of movement of the aerofoil through the air.

Fixed-wing aircraft rely upon the speed factor in preference to the surface area factor and consequently long take-off and landing strips are required since minimum threshold speeds are required both for take-off and for landing. On the other hand rotary-wing aircraft rely upon a combination of speed factor and surface area and normally the greatest lifting force is achieved near the tips of the blades where speed is at its greatest.

In rotary-wing aircraft a number of problems arise when a simple rotary aerofoil assembly is provided. These problems include a tendency for the fuselage of the aircraft to rotate in a direction contrary to that of the aerofoil assembly, and a tendency for individual blades of the aerofoil assembly to contribute a greater lift on the advancing side than on the retreat side considered with respect to the direction of motion of the aircraft. In order to overcome these problems the practise in the past has been to provide a stabilising tail rotor for the fuselage and to hinge the blades of the main aerofoil assembly, but these solutions themselves have added new problems to the stability of the aircraft — increased weight without increased lift in the case of the tail-rotor; the danger of the blades folding in the case of the hinged blades; and, generally, the problem of vibration.

Other attempts to overcome the above problems in rotary-wing aircraft have led to the use of two or more main aerofoil assemblies each contributing to the lifting effort, but these have also had serious disadvantages. For example, where two laterally spaced aerofoil assemblies have been provided the centre of gravity of the aircraft would no longer be under the centre of lift if one of the aerofoil assemblies were disabled. And where two aerofoil assemblies have been provided one above the other and rotatable in opposite directions about the same axis there has been an interaction in aerodynamic characteristics causing the pressure under the upper aerofoil assembly to be reduced thereby reducing the lift produced by that assembly.

It is an object of the present invention to provide a rotary-wing aerofoil assembly whereby one or more of the above disadvantages can be obviated or mitigated in a rotary-wing aircraft.

According to the present invention there is provided an aerofoil assembly for a rotary-wing aircraft, said assembly comprising a generally-planar annular main frame supporting radially inner and outer sets of aerofoil blades, said sets each being disposed to form an annulus and being supported in sub-frames on said main frame for rotation about a common axis.

Embodiments of the present invention will now be described, by way of example, with reference to the accompanying drawings, in which.

Figure 1:
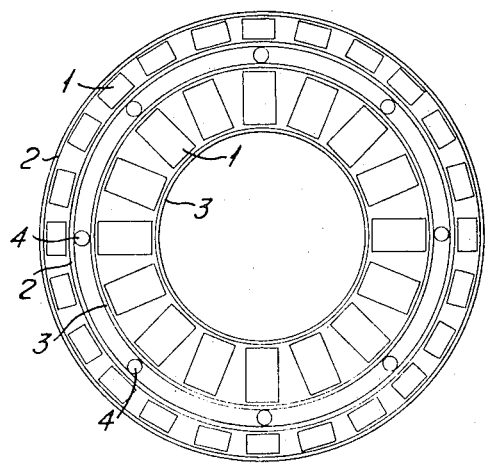
FIG. 1 is a plan view of an aerofoil assembly according to the present invention.
Figure 2:
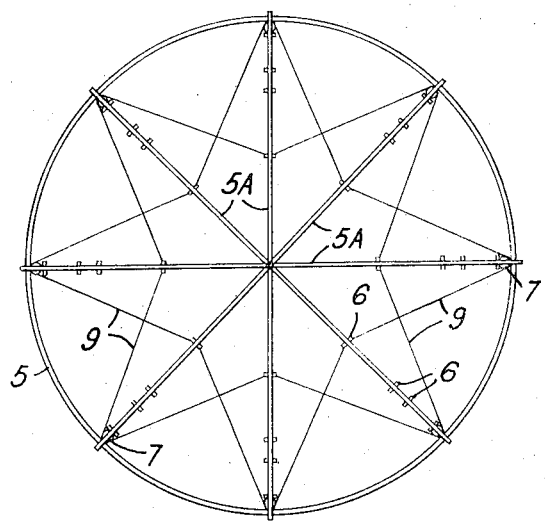
FIG. 2 is a schematic view of the supporting structure for the assembly of FIG. 1.
Figure 3:
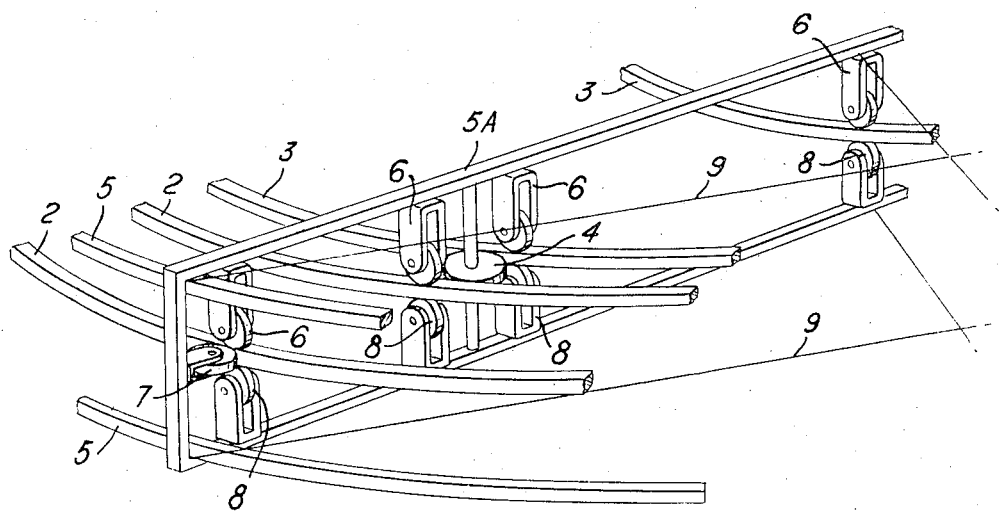
FIG. 3 is a view of a detail of the assembly.

FIG. 1 shows the aerofoil assembly comprising inner and outer annular sets of aerofoil blades 1 respectively mounted on sub-frame 3, 2 and radially-separated by circular drive members or bearings 4, the inner set of blades 1 having a larger surface area than the outer set of blades. As is shown in FIG. 2 the supporting main frame or structure comprises a peripheral member 5 carried by radial members 5A which extend from a central hub through which the axis of rotation of the assembly passes. Bracing wires 9 are also provided to strengthen the structure. FIG. 2 also shows bearings 6 which permit lift from the assembly of FIG. 1 to be transmitted to the structure of FIG. 2, these bearings 6 being shown in greater detail in FIG. 3. It will be evident that the bearings 6 are mounted between upper and lower pairs of the radial members 5A and are disposed both above and below each of the sub-frames 3, 2 for the aerofoil assemblies and at both the inner and outer peripheral margins thereof. A circular drive member or bearing 4 between the two sub-frames 3, 2 is also indicated as are lateral thrust bearings 7.

Figure 4:
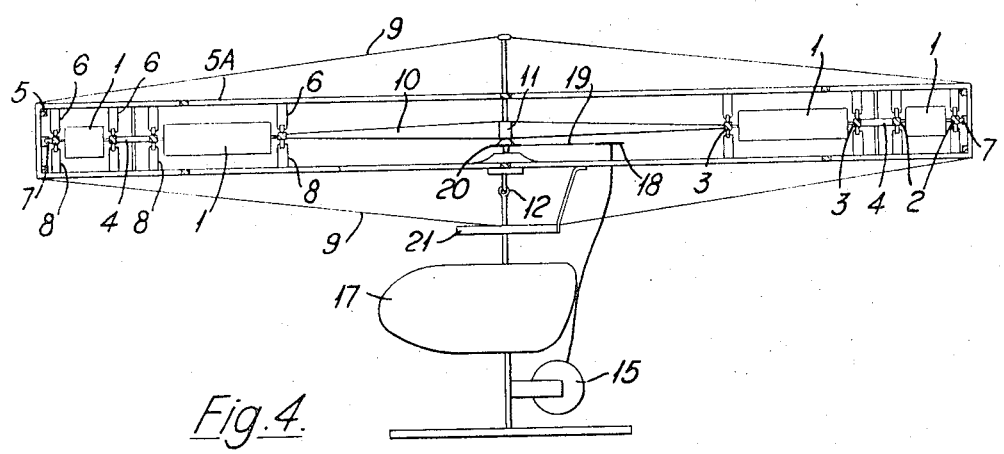
FIG. 4 shows the assembly supporting a pendulously mounted aircraft fuselage.

An elevation of the assembly, shown in FIG. 4, illustrates the inner and outer sets of aerofoil blades 1, the various bearings 4, 6, 7 and shows that the two annular sets of blades 1 are so disposed as to leave a relatively large central region free of aerofoil assembly beneath which free region a pilot's cabin 17 is pendulously mounted.

The central hub of the assembly supports a universal joint 12 from which the cabin 17 hangs and on which the power unit 15 for the aircraft is mounted. Power is fed from the unit 15 by a flexible connection and gearing 18, 19, 20 to a member 11 rotatably mounted on the central hub of the assembly and drivingly connected to the inner set of aerofoil blades 1. By virtue of the presence of the bearings 4, which act as a form of gearing between the two sets of blades, the outer set of blades 1 is rotated in the direction opposite to that of the inner set of blades 1.

Figure 5:
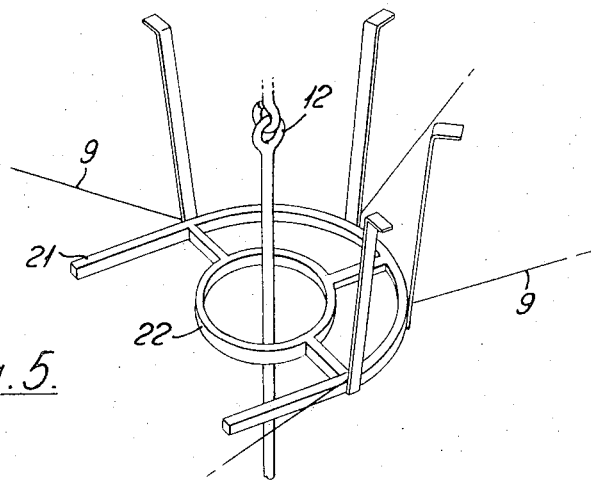
FIG. 5 is a view of a detail of FIG. 4.

FIG. 5 illustrates a detail of the assembly of FIG. 4 and shows a guard rail 22 for the member dependent from the universal joint 12 and a control bar 21 for effecting directional control of the aircraft.

Figure 6:
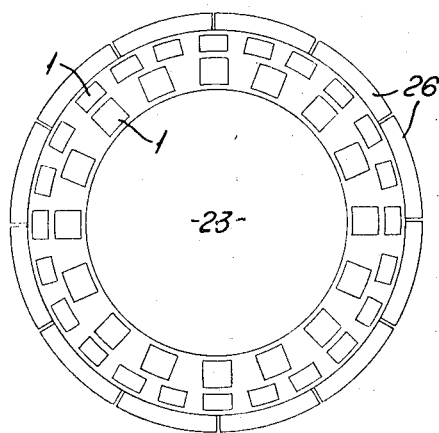
FIG. 6 is a plan view of a modified aerofoil assembly according to the present invention.
Figure 7:
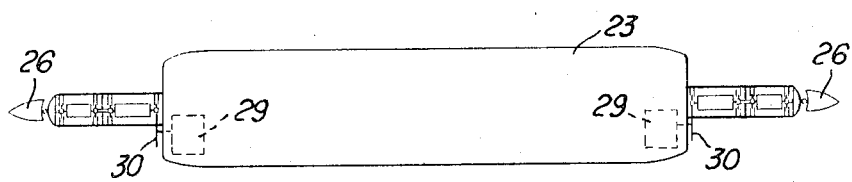
FIG. 7 is an elevational view of the assembly of FIG. 6.

The modified aerofoil assembly of FIG. 6 comprises radially inner and outer sets of aerofoil blades; there being a greater number of blades in the outer set than in the inner set. In addition, the outer marginal edge of the frame supporting the aerofoil blades also supports hinged flaps 26 in order to control flight direction. The flaps 26 are illustrated in the elevational view of FIG. 7 from which it will also be evident that the central open region of the frame houses a fuselage 23 in which drive power means 29 are located, there being a driving connection 30 between the means 29 and the radially inner set of aerofoil blades.

Figure 8:
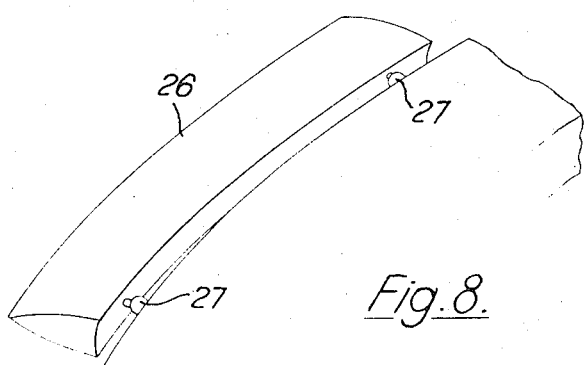
FIGS. 8 and 9 illustrate details of the assembly of FIG. 6.
Figure 9:
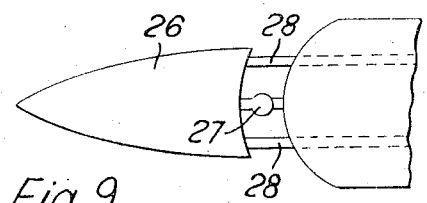

FIGS. 8 and 9 each illustrate the hinge assembly 27 for the flaps 26 and control rods 28 for operating the flaps 26 are shown in FIG. 9.

By virtue of the present invention the lifting-efficiency of the aerofoil assembly is maximised having regard to its surface area and load-carrying capacity, the inner set of aerofoil blades being of larger surface area than that of the outer set of blades and the mean diameter of the two sets of blades being such that a balanced lift for equal rotational velocities of the two sets of blades is provided.

Furthermore, the need for a tail rotor is eliminated because with the two sets of aerofoil blades rotating in opposite directions there is no resultant torque on the aircraft fuselage. The need for hinging of the individual blades is also eliminated since the two blade sets produce equal lifting forces on opposite sides of the fuselage and even if one of the sets of blades stops rotating the centre of gravity of the aircraft remains under the centre of lift and a measure of control is retained.

It will be appreciated that various modifications of details will present themselves to those skilled in the art and the above-described embodiments are not therefore to restrict the intended scope of monopoly. Typically, the various bearings, 4, 6 have been described in a generic fashion and it will be obvious that various sophisticated bearing arrangements could be utilised to perform the required function with minimum frictional loss.

Also, drive to the sets of blades could be applied to one or more of the drive members or bearings 4, or to the radially outer set of blades.

What is claimed is:
1. An aerofoil assembly for a rotary wing aircraft, said assembly comprising
   a. a relatively fixed or stationary annular main frame supporting radially spaced inner and outer contra-rotating sets of aerofoil blades, with said sets each laying in the plane of said main frame;
   b. each of said sets of blades being supported respectively in rotatable sub-frame means disposed generally coplanarly to form concentric annuluses, said sets having means supporting them via said respective rotatable sub-frames on said main frame for opposite rotation about a common axis; and
   c. wherein said two sets of aerofoil blades are coupled together for said opposite rotation by gearing means including a plurality of circumferentially spaced rotatable circular drive members interposed in operative engagement with and between the respective sub-frames.

2. An assembly as claimed in claim 1, wherein the inner set of aerofoil blades has a substantially larger surface area than has the outer set of aerofoil blades, and the mean diameters of the two sets of blades are such that, in operation, the two sets of blades produce a balanced lifting force for equal rotational velocities of the two sets of blades.

3. An assembly as claimed in claim 1, wherein the two sets of aerofoil blades are peripherally arranged around a central open region of the main frame.

4. An assembly as claimed in claim 1, including direction-control flaps hingeably mounted on the outer periphery of said main frame.

5. A rotary-wing aircraft incorporating a power source and an aerofoil assembly comprising:
   a. a relatively fixed or stationary annular main frame supporting radially spaced inner and outer contra-rotating sets of aerofoil blades, with said sets each laying in the plane of said main frame;
   b. each of said sets of blades being supported respectively in rotatable sub-frame means disposed generally coplanarly to form concentric annuluses, said sets having means supporting them via said respective rotatable sub-frames on said main frame for opposite rotation about a common axis;
   c. said two sets of aerofoil blades being coupled together for said opposite rotation by gearing means including a plurality of circumferentially spaced rotatable circular drive members interposed in operative engagement with and between the respective sub-frames; and
   d. means operatively connecting the power source with said sets of aerofoil blades.

6. A rotary-wing aircraft as claimed in claim 5, including a fuselage pendulously mounted beneath said main frame.

7. A rotary-wing aircraft as claimed in claim 5, wherein the two sets of aerofoil blades are peripherally arranged around a central open region of the main frame and a fuselage is mounted in said central open region thereof.

8. A rotary wing aircraft as claimed in claim 5, wherein said annular main frame is of generally planar form, and said power source is essentially directly connected with only one set of said aerofoil blades.

* * * * *

UNITED STATES PATENT OFFICE
CERTIFICATE OF CORRECTION

Patent No. 3,813,059  Dated May 28, 1974

Inventor(s) Raymond JEFFERSON

It is certified that error appears in the above-identified patent and that said Letters Patent are hereby corrected as shown below:

In the inventor's address, "England" should read --Great Britain--;

In the ABSTRACT, line 9, "means diameters" should read --mean diameters--; last line "seats" should read --sets--.

Signed and sealed this 8th day of October 1974.

(SEAL)
Attest:

McCOY M. GIBSON JR.
Attesting Officer

C. MARSHALL DANN
Commissioner of Patents